United States Patent [19]

Schrawder

[11] 3,802,553
[45] Apr. 9, 1974

[54] RECIPROCATING GRATE CONVEYOR WITH DRIVE BALANCE MECHANISM
[75] Inventor: Paul A. Schrawder, Allentown, Pa.
[73] Assignee: Fuller Company, Catasauqua, Pa.
[22] Filed: Mar. 9, 1972
[21] Appl. No.: 233,184

[52] U.S. Cl............................ 198/219, 198/220 DB
[51] Int. Cl. ........................ B65g 25/04, B65g 27/00
[58] Field of Search....... 198/220 BA, 220 DB, 219, 198/220 CA, 220 CB; 34/164

[56] References Cited
UNITED STATES PATENTS
3,358,385  12/1967  Maberry .............................. 34/164
3,089,687  5/1963  Peck .................................... 198/219
3,024,663  3/1962  Carrier ......................... 198/220 DB Primary Examiner—Richard E. Aegerter
Attorney, Agent, or Firm—Frank H. Thomson

[57] ABSTRACT

A reciprocating grate conveyor such as that used in a heat exchanger particularly adapted for cooling granular material such as cement clinker with the improvement of an apparatus for balancing the load on the drive mechanism. The conveyor includes a series of grates with movable grates alternating with fixed grates. The grates are mounted on a frame which is secured to wheels which ride on incline tracks. Means are provided for reciprocating the frame and thus, the movable grates. A weight arrangement is pivotally connected to the conveyor support structure for exerting a force on the movable grate support frame in the direction of material movement.

7 Claims, 5 Drawing Figures

3,802,553

RECIPROCATING GRATE CONVEYOR WITH DRIVE BALANCE MECHANISM

BACKGROUND OF THE INVENTION

This invention relates to a heat exchanger and to a reciprocating grate conveyor particularly adapted for moving granular material through a heat exchanger. More particularly, the invention relates to a reciprocating grate conveyor drive balance mechanism, for balancing the load on the reciprocating conveyor apparatus.

Reciprocating grate conveyors of the type to which the present invention relates are generally known. Also generally known are the use of such conveyors in heat exchangers. Heat exchangers and reciprocating grate conveyors of the type to which the present invention relate are shown in prior U.S. Pat. Nos. 2,846,778 and 3,358,385. In the heat exchangers shown in these two patents, a chamber having a material inlet and material outlet is supported above a plenum chamber. A reciprocating grate conveyor is used to advance material from the inlet to the outlet. When used as a cooler for cement clinker, cooling air is blown from the plenum chamber through holes in the conveyor grates and through the clinker, to thereby cool the clinker. Spent cooling air is discharged from the chamber.

In the conveyors of these prior patents, there are a series of grates with movable grates alternating with fixed grates. The movable grates are secured to a frame which has a plurality of sets of wheels and axles secured thereto. Each of the wheels rides on an inclined track which is secured to the support structure of the heat exchanger. A motor means serves to act on one set of wheels to cause the frame and movable grates to reciprocate in the direction of and away from the direction of travel of the material being conveyed. As the frame reciprocates, it also moves upward and downward parallel to the inclined tracks.

When material is on the grates of the conveyor, as the frame and movable grates move forwardly and upwardly, the forward portions of the movable grates will move over the rearward portions of the stationary or fixed grates and push material on the fixed grates forward. The material already on the forward portion of the fixed grates will spill onto the forwardly moving rearward portion of the next movable grate. When the frame and movable grates move rearwardly and downwardly, the fixed grates will prevent material on the movable grates from moving rearwardly and will result in material on the rearward portion of the movable grates being pushed forward, resulting in the spilling of material on the forward portion of the movable grates onto the rearward portion of the next fixed grate. Thus, as the movable grates are continuously reciprocated, material is advanced through the heat exchanger.

One problem often encountered with reciprocating grate type conveyors is that power surges will result as the apparatus reciprocates. These power surges are a result of changes in the load on the means for reciprocating the movable grates during operation of the conveyor. During the forward stroke of the conveyor, the movable grates and their associated frames are being moved upwardly into the bed of material and the movable grates are pushing into the bed of material. This motion requires a considerable amount of power, most of which is required to push the movable grates and associated frames up the incline. During the rearward stroke, the movable grates and associated frames are moving downwardly away from the bed of material and the movable grates are not pushing into the material but are being retracted therefrom and the weight of the machinery adds to the downward momentum of the grates and frames. This requires considerably less power than the forward stroke. The resultant surges cause excess wear on the various drive sprockets and other parts of the reciprocating mechanism.

It is believed that if some means could be provided for balancing the load on the reciprocating drive mechanism, increased life could be obtained in the entire heat exchanger and particularly in the drive mechanism for the conveyor. It is believed that with the present invention, the surging problems often encountered in reciprocating grate conveyors have been substantially reduced or eliminated. It is also believed that with the present invention, there is a reduction in the power requirements of the forward stroke of the conveyor.

SUMMARY

It is the primary object of this invention to provide an improved reciprocating grate conveyor which includes means for substantially reducing or eliminating the power surges often encountered in this type of conveyor and prolonging the life of the conveyor components.

It is a further object of this invention to provide an improved heat exchanger employing a reciprocating grate conveyor which includes apparatus for balancing the drive mechanism so that the power requirements of the drive are substantially equal in both directions of reciprocation.

It is a still further object of this invention to provide a drive balance mechanism for a reciprocating grate conveyor wherein the power requirements are substantially equal in both directions of reciprocation.

In general, the foregoing and other objects of this invention will be carried out by providing in a heat exchanger apparatus comprising a generally longitudinal chamber having an inlet at one end for material and an outlet at the other end, structural means for supporting said chamber, means for transporting material through said chamber from said inlet to said outlet, said means for transporting including a series of grate means, said grate means including fixed grates alternating with movable grates and means for reciprocating said movable grates relative to said fixed grates whereby as said movable grates are reciprocated towards and away from said outlet, material is advanced through said chamber, the improvement comprising means for balancing the load on said means for reciprocating the movable grates including means for exerting a force toward said outlet on said means for reciprocating the movable grates.

BRIEF DESCRIPTION OF THE DRAWINGS

This invention will be described in connection with the annexed drawings wherein:

FIG. 4 is a fragmentary end view of the balance mechanism of the present invention.

DESCRIPTION OF THE PREFERRED EMBODIMENT

Figure 1:
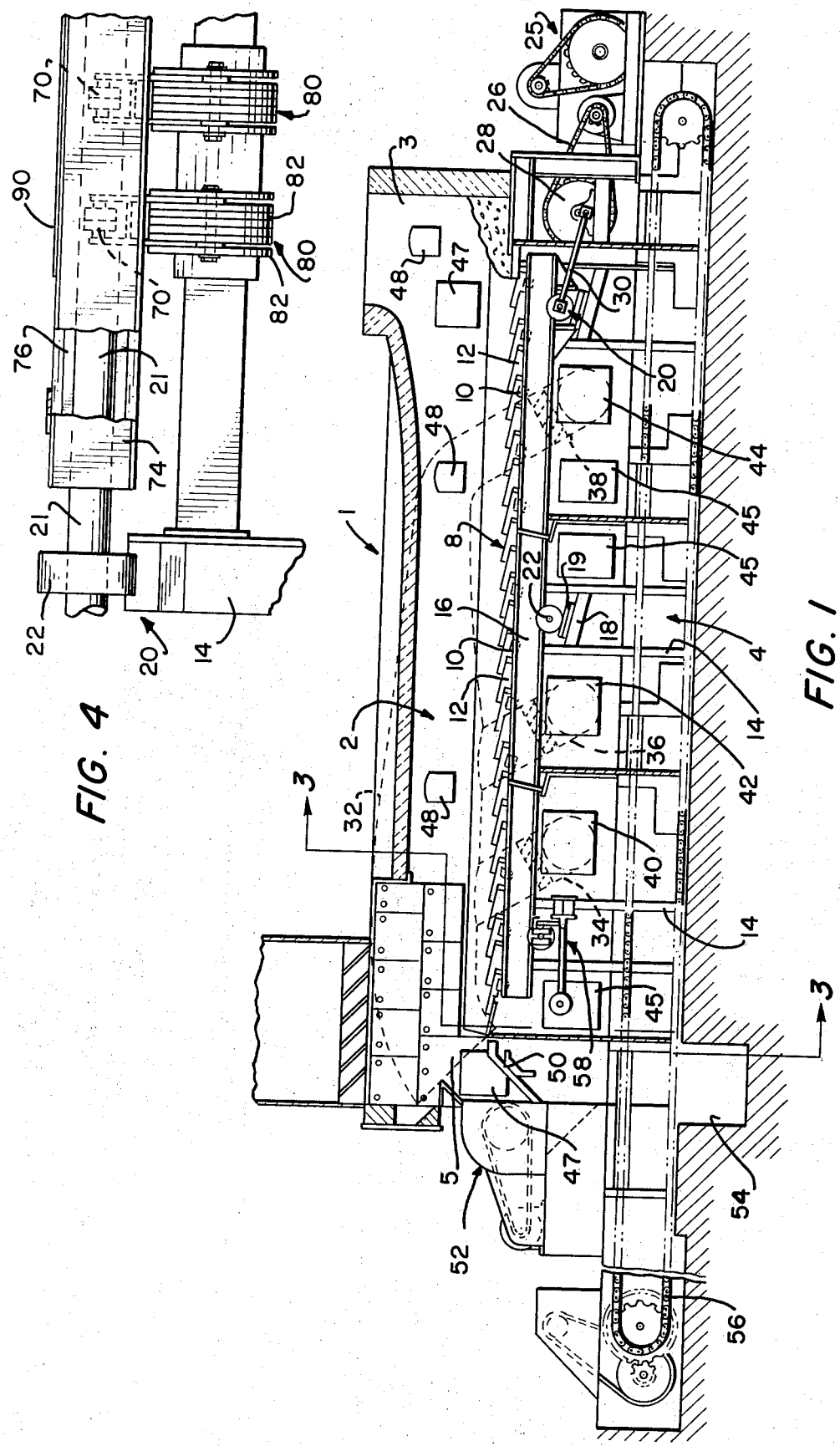
FIG. 1 is a diagrammatic view of a heat exchanger employing a reciprocating grate conveyor and the drive balance mechanism of the present invention.

Referring to the drawing and in particular to FIG. 1, there is shown a cooler or heat exchanger employing a reciprocating conveyor grate particularly adapted for cooling granular material such as cement clinker discharged from a rotary kiln. The heat exchanger generally indicated at 1 is divided into an upper material chamber 2 and a lower plenum chamber 4 by means of a reciprocating grate conveyor generally indicated at 8. The upper material chamber is suitably lined with a refractory and includes a material inlet 3 and a material outlet 5. Walls 7 enclose the plenum chamber 4.

The reciprocating grate conveyor is adapted to support a bed of material in the chamber 2 and advance the material from the inlet 3 to the outlet 5. The conveyor includes a series of grates including movable grates 10 and fixed grates 12 each of which may be of any desired configuration such as that shown in U.S. Pat. No. 2,846,778 and include a plurality of holes therethrough to permit communication between the lower plenum 4 and the material chamber 2.

The conveyor is mounted on a suitable support structure such as 14 in a manner generally shown in U.S. Pat. Nos. 2,846,778 and 3,358,385. The fixed grates 12 are secured to the structure 14 in any desired manner. The movable grates 10 are suitably secured to a pair of parallel, spaced apart frames 16. Horizontally inclined frame members 18 are mounted on the structure 14 so that they are inclined in a direction opposite to the direction of material movement. A track 19 is mounted on each of the frame members 18.

A plurality of spaced apart wheel and axle means 20 including an axle 21 and a pair of wheels 22 are mounted on the frames 16 and positioned so that the wheels 22 ride on the tracks 19.

The movable grates 10 are adapted to be reciprocated. For this purpose, a variable speed drive and transmission unit generally indicated at 25 is provided. A chain 26 and sprocket 28 are driven by the drive and transmission unit 25. A crank arm 30 is connected to the sprocket 28 at one end and to a wheel and axle means 20 at its other end. As motive power is supplied to the drive unit 25 and sprocket 28 is rotated, the crank arm 30 is reciprocated and this reciprocal motion is imparted to the wheel and axle means 20 to which it is connected. In view of the connection between the wheel means 20 and the frames 16, the frames and attached movable grates 10 are reciprocated. The inclined tracks 19 cause the frames and grates to move upwardly and downwardly as well as forwardly and rearwardly in the direction of and opposite to the direction in which the material is being moved. This reciprocation of the movable grates 10 causes the material to be advanced through the chamber 2 as in prior conveyors of this type.

A manifold 32 is provided and includes connections 34, 36 and 38 which are provided with suitable fans or blowers (not shown) which have their outlets at air inlet ports 40, 42 and 44. These fans blow cooling air into the plenum 4 for passage through the openings in the grates 10 and 12 for passage through the bed of granular material in the chamber 2 to thereby cool the granular material.

The plenum 4 may be provided with access doors 45. The chamber 2 may be provided with access doors 47 and observation ports 48. The outlet may be provided with a suitable grizzly 50 for controlling the size of material discharged through the outlet 5. A breaker generally indicated at 52 is provided for oversize material. The breaker 52 will reduce the size of oversize material so that it will pass through grizzly 50. A pit 54 is provided for cooled material removal. Because of the openings in the grates 10 and 12, fine material may pass through the grates to the plenum 4. In order to remove this fine material, a suitable drag chain conveyor 56 is provided for conveying these fines to the pit 54.

With coolers and conveyors as shown in the present invention, when the grates reciprocate in the direction of the material advance, namely, from the inlet towards the outlet of the cooler, the grates must move upwardly into the bed of material and the movable grates 10 must push material forward. When the grates back towards the material inlet or in a direction opposite in the direction of material flow, the grates are moving downwardly away from the bed of material and there is no movement by the grates into the material. It should be obvious, therefore, that upon movement of the movable grates and associated framework in the direction of material movement, more power will be required than during retraction of the grates. As the grates are retracted, there will be a lessening of the load on the drive means. The changes in load result in undesired power surges which results in increased wear on the drive mechanism and reduction in operating life. When the grates begin to move forward, there will be a sudden increase in the load on the drive means. This sudden increase can cause excessive wear on the drive motor and various drive sprockets and chains.

In order to overcome these power surges, I have provided a drive balance mechanism. This drive balance mechanism operates on the principle of applying a general steady force in the direction of advancement of the reciprocating grate. It is believed that the application of such a force will decrease the power required to move the movable grates forward and increase the power required to retract the movable grates thereby balancing the power requirements and reduce surging.

Figure 2:
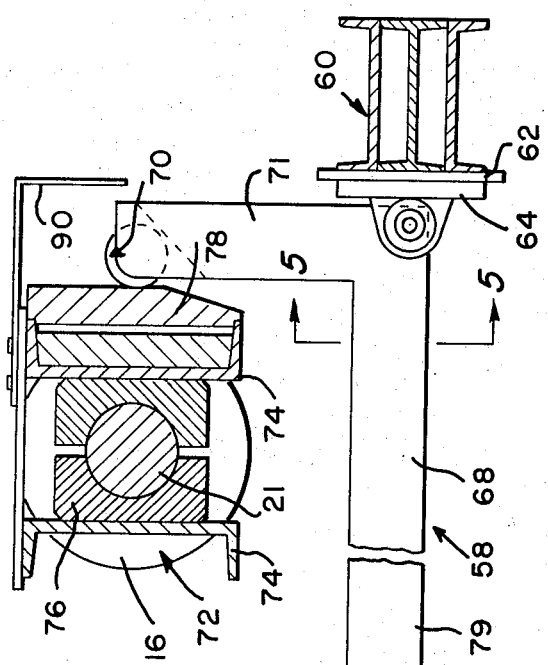
FIG. 2 is an elevational view of the balance mechanism of the present invention.
Figure 5:
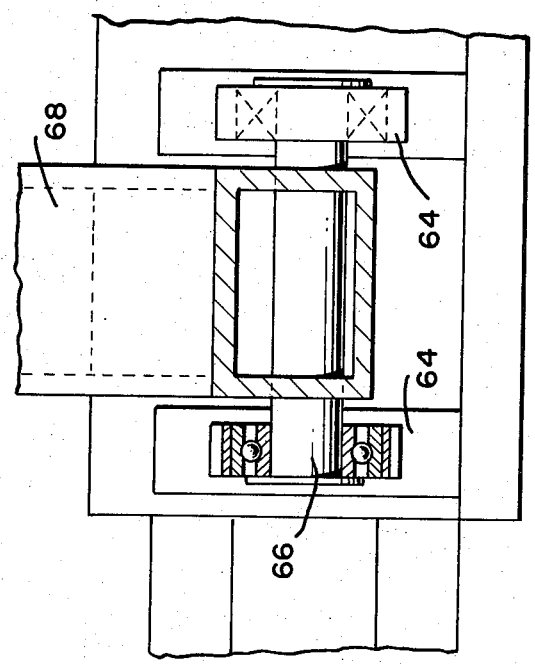
FIG. 5 is a sectional view on an enlarged scale of a portion of the balance mechanism and taken on the line 5—5 of FIG. 2.
Figure 3:
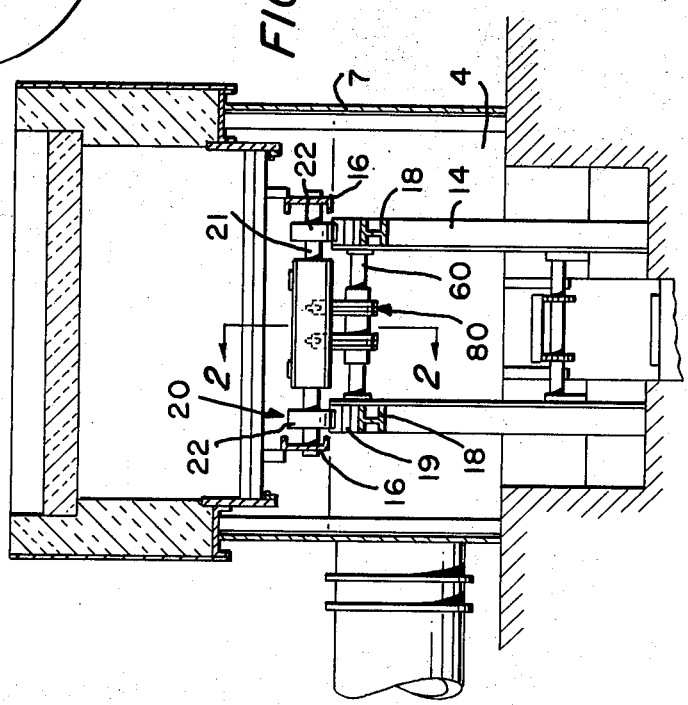
FIG. 3 is a sectional view taken on the line 3—3 of FIG. 1.

Referring to FIGS. 2 to 4, the balance mechanism of the present invention can be seen and is generally indicated at 58. A boxed H-beam 60 is provided and secured to the structural members 14 of the cooler at a point just rearward of the forwardmost wheel and axle means 20. A pad 62 is suitably secured to the boxed beam 60 and has a plurality of pillow block bearings 64 secured thereto. In the embodiment shown, I have provided four such pillow block bearings. A pair of shafts 66 is provided, with each rotatably mounted between a pair of these bearings as shown in FIG. 5. A right angle actuator arm 68 is secured to the shaft 66 in a position shown in FIG. 2. With this arrangement, the actuator arm 68 is pivotally secured to the boxed beam 60 and thus, the structural support means for the conveyor. A bearing means 70 of any suitable type is rotatably secured to the short leg 71 of the actuator arm 68 as shown in FIGS. 2 and 4.

A frame wheel shaft housing generally indicated at 72 is suitably secured to the axle 21 of the wheel and axle means 20. The housing 72 may include a pair of channel members 74 and support members 76 with any desired fastening means (not shown) used to secure the assembly to the axle 21. A spacer block 78 is secured by any means, such as by welding, to one of the channel members 74 as shown in FIG. 2. The bearing 70 engages the spacer 78.

Weight means 80 is mounted in the long leg 79 of the actuator arm as shown in FIGS. 2 and 4. In the present embodiment, the weight means 80 comprises a plurality of discs 82. The use of a plurality of discs permits the adjustment of the amount of weight used in the drive balance mechanism.

With the drive balance mechanism in place, the weights 80 cause the actuator arm 68 to tend to pivot on the bearings 64 about the beam 60 and structural means 14. This produces a substantial force on the axle 21 and wheel 22 tending to move the beam 16 and movable grates 10 towards the material outlet or in the direction of material movement. This steady force has been shown to substantially reduce and even eliminate power surging. When the drive mechanism moves the beam 16 and movable grates 10 towards the material outlet, the drive balance mechanism aids the movement of the reciprocating mechanism in the direction of material movement thereby reducing the power required to advance the movable grates. When the drive mechanism retracts the movable grates 10, the balance mechanism tends to prevent this retraction.

Thus, the balance mechanism 58 decreases the power required to advance the conveyor and resists the momentum created by the total weight of the conveyor moving down the inclined tracks when the conveyor retracts. This results in a balancing of the power required to advance and retract the conveyor.

The drive balance mechanism of the present invention has the advantage of having a low profile. Because of its configuration, the mechanism may be placed in the plenum chamber without interfering with the movement of fines through the plenum chamber.

Because the balance mechanism is placed in the plenum chamber, fines which fall through the grates will fall onto the mechanism. A guard, generally indicated at 90, is secured to the housing 72 and convers the bearing means 70 and block 78 to prevent the fines from falling between the bearing and the block.

The length of the legs 71 and 79 of the actuator arm 68 and the amount of weight 80 added to the mechanism is preferably a function of the weight of the conveyor assembly. It is believed that the weight of the bed of material can be generally ignored. This is because it is believed that the difference between the power required to move the frames 16 up the inclined tracks 19 and the power required to retract the movable frame and grates is primarily responsible for the undesired power surges.

From the foregoing, it should be apparent that the objects of this invention have been carried out. A reciprocating grate conveyor has been provided which includes a drive balance mechanism to substantially reduce power surges. Wear on the drive mechanism will be reduced because of a reduction in the surges. In view of this wear reduction, the heat exchanger will be able to operate longer without undesired downtime for repair.

It is intended that the foregoing description be merely that of a preferred embodiment and that the invention be limited solely by that which is within the scope of the appended claims.

I claim:

1. In a heat exchanger apparatus comprising a generally longitudinal chamber having an inlet at one end for material and an outlet at the other end, structural means for supporting said chamber, means for transporting material through said chamber from said inlet to said outlet, said means for transporting including a series of grate means, said grate means including fixed grates alternating with movable grates and means for reciprocating said movable grates relative to said fixed grates whereby as said movable grates are reciprocated towards and away from said outlet, material is advanced through said chamber, the improvement comprising weight means for exerting a substantially steady force toward said outlet on said means for reciprocating the movable grates for balancing the load on said means for reciprocating the movable grates; beam means mounted on said structural means, an angle member pivotally mounted on said beam means and having one leg substantially parallel to said means for transporting material and the other leg adapted to contact said means for transporting material, and said weight means is mounted on said one leg.

2. In the heat exchanger of claim 1, said weight means including a plurality of individual discs.

3. In the heat exchanger of claim 1, said means for exerting a force being mounted near the outlet of said chamber.

4. In combination, a reciprocating grate conveyor for moving material, comprising support structure; a plurality of grate means including fixed grates alternating with movable grates; means for reciprocating said movable grates including frame means for supporting said movable grates having a plurality of spaced apart wheel and axle means, a track mounted on said support structure for each of said wheel and axle means, and means for moving said frame means alternately in and opposite to the direction of material movement so that said frame means rides on the tracks; beam means mounted on said support structure; angle means pivotally connected to said beam means and having one leg substantially parallel to said frame means and its other leg adapted to contact said frame means; and weight means mounted on said one leg whereby said weight means exerts a substantially steady force in the direction of material movement on said frame means.

5. The combination of claim 4 further comprising block means secured to one of said wheel and axle means and said other leg is adapted to contact said block means.

6. In the combination of claim 5, said tracks being inclined.

7. In the combination of claim 6, said weight means being a plurality of individual discs.

* * * * *